(12) United States Patent
Suzuki

(10) Patent No.: US 7,813,089 B2
(45) Date of Patent: Oct. 12, 2010

(54) MOTOR CONTROLLER AND ELECTRIC POWER STEERING APPARATUS

(75) Inventor: Hiroshi Suzuki, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 278 days.

(21) Appl. No.: 12/036,733

(22) Filed: Feb. 25, 2008

(65) Prior Publication Data

US 2008/0290829 A1 Nov. 27, 2008

(30) Foreign Application Priority Data

Feb. 26, 2007 (JP) ............................. 2007-046106

(51) Int. Cl.
*H02H 7/08* (2006.01)
(52) U.S. Cl. .................. 361/31; 361/30; 361/23; 361/1; 318/432; 318/493; 318/494; 318/638; 318/639; 318/434; 318/599; 318/400.04; 318/400.05; 180/443; 180/446; 323/267; 324/76.52; 324/76.77; 324/76.79
(58) Field of Classification Search ............ 318/432, 318/400.04, 400.05, 599, 638, 639, 434; 361/30, 31, 23, 1; 324/76.52, 76.77, 76.79; 180/443, 446; 323/267

See application file for complete search history.

(56) References Cited

U.S. PATENT DOCUMENTS

| | | | | |
|---|---|---|---|---|
| 4,697,130 A * | 9/1987 | Dadpey et al. | ............... | 318/760 |
| 5,365,153 A * | 11/1994 | Fujita et al. | ................... | 318/34 |
| 5,689,170 A * | 11/1997 | Ishikawa | ..................... | 318/811 |
| 5,752,209 A * | 5/1998 | Nishimoto et al. | ............ | 701/41 |
| 6,037,741 A * | 3/2000 | Yamada et al. | .............. | 317/721 |
| 6,130,494 A | 10/2000 | Schob | | |
| 6,297,574 B1 | 10/2001 | Schob et al. | | |
| 6,456,946 B1 * | 9/2002 | O'Gorman | ................... | 702/58 |
| 6,504,336 B2 | 1/2003 | Sakamaki | | |
| 6,639,379 B2 | 10/2003 | Matsushita et al. | | |
| 6,741,060 B2 | 5/2004 | Krefta et al. | | |
| 6,927,548 B2 | 8/2005 | Nishizaki et al. | | |
| 7,005,822 B1 * | 2/2006 | O'Gorman et al. | .......... | 318/608 |
| 7,084,601 B2 * | 8/2006 | Maeda et al. | ............... | 318/806 |
| 7,091,684 B2 * | 8/2006 | Kobayashi et al. | .......... | 318/432 |
| 7,141,948 B2 | 11/2006 | Kifuku et al. | | |
| 7,161,317 B2 * | 1/2007 | Matsushita et al. | .......... | 318/432 |

(Continued)

FOREIGN PATENT DOCUMENTS

EP 1527978 A2 5/2005

(Continued)

OTHER PUBLICATIONS

U.S. Appl. No. 12/128,304, filed May 28, 2008, Suzuki.

(Continued)

*Primary Examiner*—Rita Leykin
(74) *Attorney, Agent, or Firm*—Oblon, Spivak, McClelland, Maier & Neustadt, L.L.P.

(57) ABSTRACT

In a motor controller, if a failed electric current flow in any one of phases of a motor is detected, a motor control signal is generated, based on a phase other than the phase with the failed electric current flow, in such a manner that a motor electric current matches a required torque except for at a specific rotation angle corresponding to the phase with the failed electric current flow.

5 Claims, 7 Drawing Sheets

U.S. PATENT DOCUMENTS

| | | | |
|---|---|---|---|
| 7,161,323 B2 * | 1/2007 | Ajima et al. | 318/629 |
| 7,188,702 B2 | 3/2007 | Takagi et al. | |
| 7,193,388 B1 * | 3/2007 | Skinner et al. | 318/811 |
| 7,199,538 B2 * | 4/2007 | Kameya | 318/400.05 |
| 7,240,761 B2 | 7/2007 | Nagase et al. | |
| 7,298,109 B2 | 11/2007 | Sakamaki et al. | |
| 7,321,216 B2 * | 1/2008 | Suzuki | 318/609 |
| 7,348,756 B2 | 3/2008 | Ma et al. | |
| 7,394,214 B2 * | 7/2008 | Endo et al. | 318/432 |
| 7,414,425 B2 * | 8/2008 | O'Gorman et al. | 324/772 |
| 7,439,693 B2 * | 10/2008 | Shoda et al. | 318/135 |
| 7,474,067 B2 | 1/2009 | Ueda et al. | |
| 2001/0005121 A1 | 6/2001 | Sakamaki | |
| 2002/0145837 A1 | 10/2002 | Krefta et al. | |
| 2005/0258791 A1 | 11/2005 | Iwami et al. | |
| 2008/0067960 A1 * | 3/2008 | Maeda et al. | 318/400.02 |
| 2009/0192665 A1 | 7/2009 | Nozawa | |

FOREIGN PATENT DOCUMENTS

| | | |
|---|---|---|
| EP | 1623909 A2 | 2/2006 |
| JP | 2003-026020 | 1/2003 |

OTHER PUBLICATIONS

U.S. Appl. No. 12/139,054, filed Jun. 13, 2008, Suzuki.

U.S. Appl. No. 12/209,524, filed Sep. 12, 2008, Suzuki.

U.S. Appl. No. 12/212,165, filed Sep. 17, 2008, Suzuki.

USPTO Notice of Allowance and Fee(s) Due for co-pending U.S. Appl. No. 12/128,304, Apr. 19, 2010, 16 pages.

USPTO Qualye Office Action for co-pending U.S. Appl. No. 12/036,614, May 25, 2010, 17 pages.

* cited by examiner

MOTOR CONTROLLER AND ELECTRIC POWER STEERING APPARATUS

CROSS-REFERENCE TO RELATED APPLICATIONS

This application is based on and claims priority from Japanese Patent Application No. 2007-046106 filed on Feb. 26, 2007, the entire contents of which are incorporated herein by reference.

BACKGROUND OF THE INVENTION

The present invention relates to a motor controller and an electric power steering apparatus having the motor controller.

In many cases, a motor controller provided in an electric power steering apparatus (EPS) includes anomaly detecting means that detects an anomaly such as a failed electric current flow caused in any one of phases of a motor, that is, U, V, or W-phase, due to a break of a power supply cable or a failed contact of a driver circuit. Normally, if an anomaly is detected by the anomaly detecting means, the motor is quickly stopped to perform fail-safe.

This greatly changes steering characteristics of the EPS, requiring the driver to increase the force applied to the steering wheel. In this regard, for example, Japanese Laid-Open Patent Publication No. 2003-26020 discloses a motor controller that continuously operates a motor using two phases other than a phase with a failed electric current flow even after such failure has been detected in the phase. In this manner, assist force is continuously applied to a steering system so as to assist in manipulation of a steering wheel by the driver. This suppresses increase of load on the driver.

However, if a sinusoidal wave electric current is supplied to the respective U, V, and W-phases of the motor and the motor is continuously operated using the two phases other than the phase with the failed electric current flow, as has been described, after such failure has occurred in any one of the phases (which is, for example, the U-phase, as illustrated in FIG. 10), a torque ripple is caused and steering comfort is decreased due to the torque ripple. Specifically, in this case, the motor is continuously operated without obtaining a motor electric current matching a required torque. In other words, with reference to FIG. 11 in which change of the motor electric current in a two phase drive mode is represented in a d/q coordinate system, the actual q-axis electric current value changes in a sinusoidal manner despite a constant q-axis electric current command value, which is a target control value of the motor torque.

SUMMARY OF THE INVENTION

Accordingly, it is an objective of the present invention to provide a motor controller that suppresses a torque ripple when an electric current flow fails in any one of phases of a motor, and an electric power steering apparatus having the motor controller.

To achieve the foregoing and other objectives and in accordance with a first aspect of the present invention, a motor controller is provided. The motor controller includes a motor control signal output section (motor control signal output means) that outputs a motor control signal and a driver circuit that supplies a three phase drive power to a motor based on the motor control signal provided by the motor control signal output section (the motor control signal output means). The motor control signal output section (the motor control signal output means) includes an electric current command value calculating section (electric current command value calculating means), a motor control signal generating section (motor control signal generating means), and an anomaly detecting section (anomaly detecting means). The electric current command value calculating section (electric current command value calculating means) calculates an electric current command value corresponding to a required torque to be generated by the motor. The motor control signal generating section (motor control signal generating means) generates the motor control signal by performing a feedback control on an electric current in such a manner as to produce a motor electric current corresponding to the electric current command value obtained by the electric current command value calculating section (the electric current command value calculating means). The anomaly detecting section (anomaly detecting means) detects a failed electric current flow in any one of phases of the motor. If the anomaly detecting section (the anomaly detecting means) detects a failed electric current flow in any phase of the motor, the motor control signal output section (the motor control signal output means) generates, based on a phase other than the phase with the failed electric current flow, the motor control signal in such a manner that the motor electric current matches the required torque except for at a specific rotation angle corresponding to the phase with the failed electric current flow.

In accordance with a second aspect of the present invention, an electric power steering apparatus including the motor controller.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention will now be described with reference to FIGS. 1 to 7.

Figure 1:
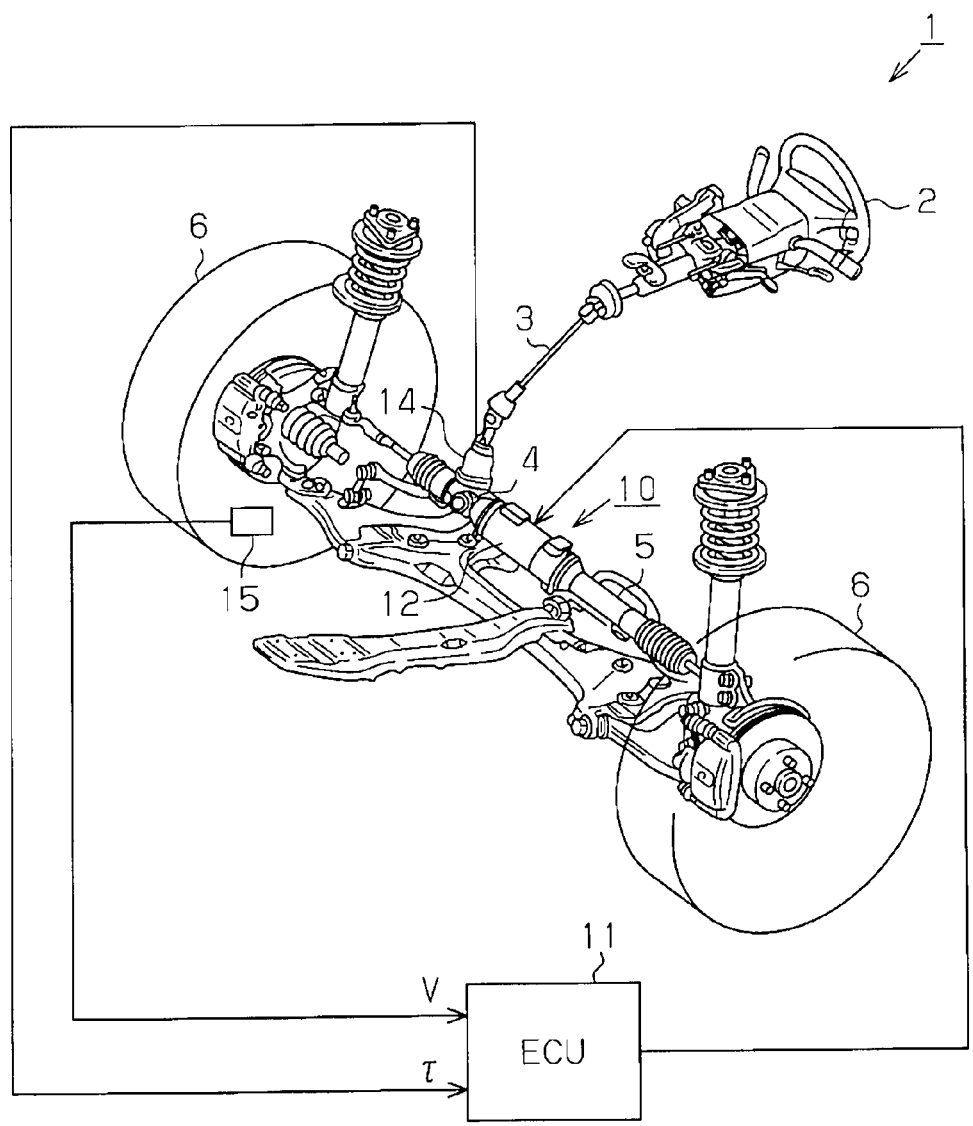
FIG. 1 is a schematic view showing an electric power steering apparatus (EPS) according to one embodiment of the present invention.

As shown in FIG. 1, a vehicle with an electric power steering apparatus (EPS) 1 according to the illustrated embodiment includes a steering shaft 3 extending from a steering wheel 2. The steering shaft 3 is connected to a rack 5 through a rack and pinion mechanism 4. As the steering wheel 2 is manipulated, the steering shaft 3 rotates. Such rotation is converted into linear reciprocation of the rack 5 through the rack and pinion mechanism 4. As the rack 5 linearly reciprocates, steering angles of steerable wheels 6 change.

The EPS 1 includes an EPS actuator 10 and an ECU 11. The EPS actuator 10 is a steering force assisting section that applies assist force to a steering system of the vehicle to assist in manipulation of the steering wheel 2 by the driver. The ECU 11 serves as control means (a control section) that controls operation of the EPS actuator 10.

The EPS actuator 10 is a rack type EPS actuator driven by a motor 12, which is the drive source of the EPS actuator 10. The motor 12 is arranged coaxially with the rack 5. The motor 12 generates assist torque, which is transmitted to the rack 5 through a non-illustrated ball screw mechanism. The motor 12 is a brushless motor and rotates when driven by drive power of three phases, or U, V, and W-phases, which is supplied by the ECU 11. The ECU 11 adjusts the assist torque produced by the motor 12 in such a manner as to apply an appropriate level of assist force to the steering system (power assistance control). In other words, the ECU 11 functions as a motor controller.

A torque sensor 14 and a vehicle speed sensor 15 are connected to the ECU 11. Based on a steering torque τ and a vehicle speed V, which are detected by the torque sensor 14 and the vehicle speed sensor 15, respectively, the ECU 11 controls operation of the EPS actuator 10, and performs the power assistance control.

The electric configuration of the EPS according to the illustrated embodiment will hereafter be explained.

Figure 2:
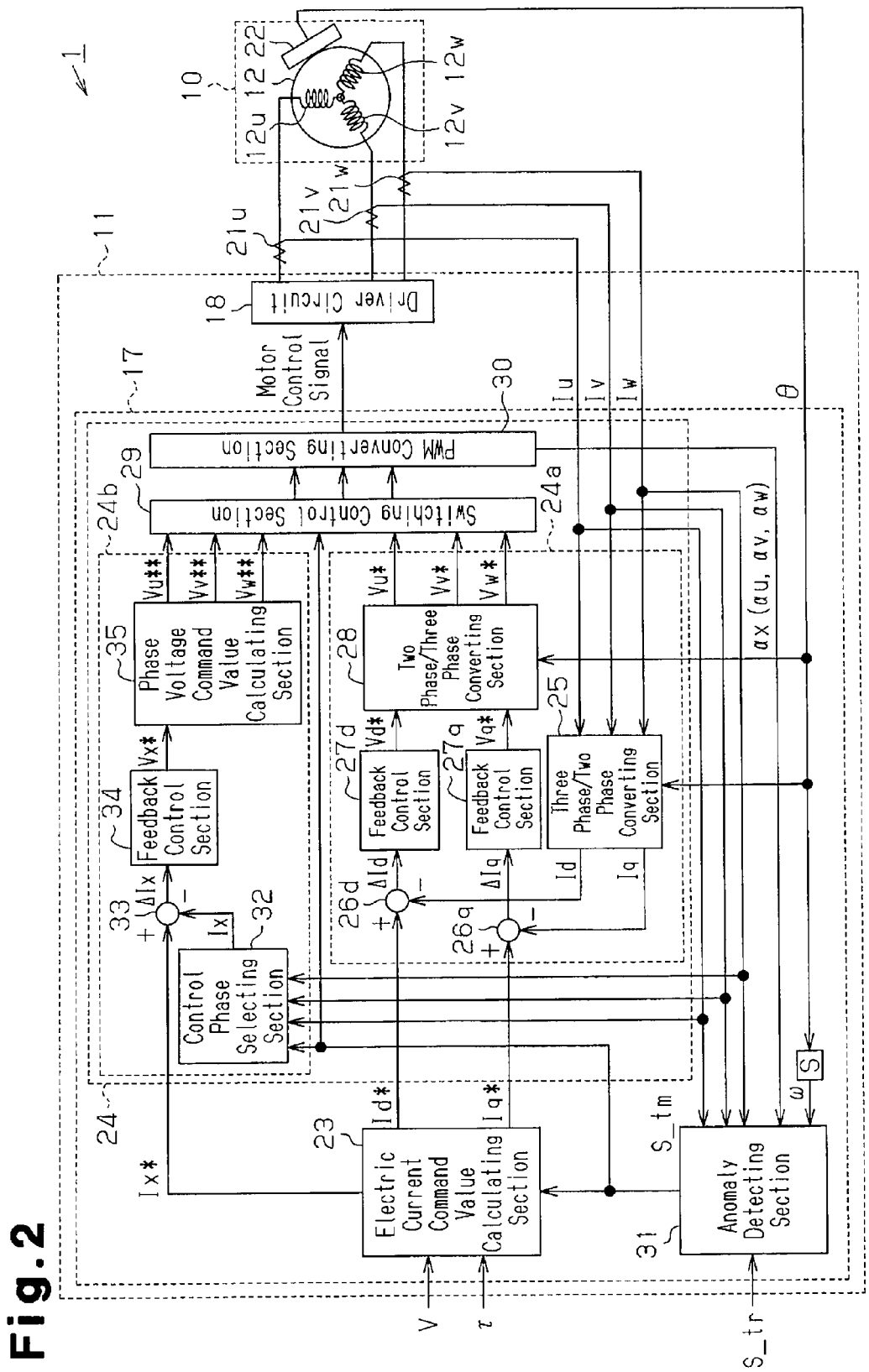
FIG. 2 is a block diagram representing the electric configuration of the EPS of FIG. 1.

As illustrated in FIG. 2, which is the block diagram representing the EPS 1, the ECU 11 has a microcomputer 17 serving as a motor control signal output section (motor control signal output means) and a driver circuit 18. The microcomputer 17 outputs a motor control signal. The driver circuit 18 supplies the three phase drive power to the motor 12 based on the motor control signal produced by the microcomputer 17.

The driver circuit 18 is a known PWM inverter that is configured by connecting three arms corresponding to the respective three phases in parallel. Each of the arms includes a pair of switching elements that are connected in series. The motor control signal, which is output by the microcomputer 17, defines the ON duty ratio of each of the switching elements, which form the driver circuit 18. When the motor control signal is provided to the gate terminal of each switching element, the switching element is turned selectively on and off in response to the motor control signal. This converts DC voltage of a non-illustrated power source mounted in the vehicle to the three phase drive power. The drive power is then fed to the motor 12.

The ECU 11 has electric current sensors 21u, 21v, and 21w and a rotation angle sensor 22. Each of the electric current sensors 21u, 21v, 21w detects the corresponding one of phase electric current values Iu, Iv, and Iw, which are values of phase electric currents supplied to the motor 12. The rotation angle sensor 22 detects a rotation angle θ of the motor 12. Based on the phase electric current values Iu, Iv, Iw and the rotation angle θ of the motor 12, which are detected by the corresponding sensors 21u, 21v, 21w, and 22, and the steering torque τ and the vehicle speed V, the microcomputer 17 provides the motor control signal to the driver circuit 18.

In a normal state, to generate the motor control signal, the microcomputer 17 converts the phase electric current values Iu, Iv, and Iw, which are provided by the corresponding electric current sensors 21u, 21v, and 21w, into a d-axis electric current value Id and a q-axis electric current value Iq of a d/q coordinate system. The microcomputer 17 thus performs feedback control on the electric currents in the d/q coordinate system.

The microcomputer 17 includes an electric current command value calculating section (electric current command value calculating means) 23 and a motor control signal generating section (motor control signal generating means) 24. The electric current command value calculating section 23 calculates an electric current command value as a target control value of the assist force to be applied to the steering system, that is, the motor torque. More specifically, in the normal state, the electric current command value calculating section 23 calculates a d-axis electric current command value Id* and a q-axis electric current command value Iq* based on the steering torque τ and the vehicle speed V, which are detected by the torque sensor 14 and the vehicle speed sensor 15, respectively. The electric current command value calculating section 23 then outputs the obtained d-axis electric current command value Id* and q-axis electric current command value Iq* to the motor control signal generating section 24. Along with the d-axis electric current command value Id* and q-axis electric current command value Iq* provided by the electric current command value calculating section 23, the motor control signal generating section 24 receives the phase electric current values Iu, Iv, and Iw detected by the electric current sensors 21u, 21v, and 21w and the rotation angle θ provided by the rotation angle sensor 22. Thus, based on the phase electric current values Iu, Iv, and Iw and the rotation angle θ (an electric angle), the motor control signal generating section 24 performs the feedback control on the electric currents in the d/q coordinate system. As a result, the motor control signal is generated based on the electric current command values determined by the electric current command value calculating section 23, which are the d-axis electric current command value Id* and the q-axis electric current command value Iq*.

The motor control signal generating section 24 has a first control section 24a, which calculates phase voltage command values Vu*, Vv*, and Vw* through the feedback control on the electric currents in the d/q coordinate system. In the normal state, the motor control signal generating section 24 produces the motor control signal based on the phase voltage command values Vu*, Vv*, and Vw*, which are obtained by the first control section 24a.

More specifically, the phase electric current values Iu, Iv, Iw are input to a three phase/two phase converting section 25 of the first control section 24a, together with the rotation angle θ. The three phase/two phase converting section 25 converts the phase electric current values Iu, Iv, Iw into the d-axis electric current value Id and the q-axis electric current value Iq of the d/q coordinate system. The q-axis electric current command value Iq*, which is output by the electric current command value calculating section 23, is input to a subtractor 26q, along with the q-axis electric current value Iq. The d-axis electric current command value Id*, which is provided by the electric current command value calculating section 23, is input to a subtractor 26d, together with the d-axis electric current value Id. In the illustrated embodiment, the electric current command value calculating section 23 outputs zero as the d-axis electric current command value Id*. The subtractor 26d obtains a d-axis electric current deviation ΔId and the subtractor 26q determines a q-axis electric current deviation ΔIq. The d-axis electric current deviation ΔId and the q-axis electric current deviation ΔIq are input to a feedback control section 27d and a feedback control section 27q, respectively. The feedback control sections 27d, 27q each carry out feedback control in such a manner that the d-axis electric current value Id and the q-axis electric current value Iq follow the d-axis electric current command value Id* and the q-axis electric current command value Iq*, respectively.

Specifically, the feedback control section 27d multiplies the d-axis electric current deviation ΔId provided by the subtractor 26d by a predetermined feedback gain (a PI gain), thus obtaining a d-axis voltage command value Vd*. The feedback control section 27q multiplies the q-axis electric current deviation ΔIq input by the subtractor 26q by the feedback gain (the PI gain), and thus determines a q-axis voltage command value Vq*. The d-axis voltage command value Vd* and the q-axis voltage command value Vq*, which are provided by the corresponding feedback control sections 27d, 27q, are input to a two phase/three phase converting section 28, along with the rotation angle θ. The two phase/three phase converting section 28 converts the d-axis voltage command value Vd* and the q-axis voltage command value Vq* to phase voltage command values Vu*, Vv*, and Vw*.

The phase voltage command values Vu*, Vv*, Vw*, which are obtained by the first control section 24a, are input to a PWM converting section 30 through a switching control section 29. The PWM converting section 30 generates duty command values αu, αv, and αw in correspondence with the phase voltage command values Vu*, Vv*, and Vw*. The motor control signal generating section 24 generates a motor control signal having an ON duty ratio commanded by the duty command values αu, αv, αw. The microcomputer 17 outputs the motor control signal to the gate terminal of each switching element of the driver circuit 18. In this manner, the operation of the driver circuit 18 is controlled and the supply of the drive power to the motor 12 is regulated.

(Control when Anomaly Occurs)

If an anomaly occurs, the ECU 11 operates in the following manner.

With reference to FIG. 2, the microcomputer 17 of the ECU 11 has an anomaly detecting section (anomaly detecting means) 31, which detects an anomaly and identifies the nature of the anomaly when any anomaly occurs in the EPS 1. The ECU 11 (the microcomputer 17) changes control modes of the motor 12 in correspondence with the nature of the anomaly identified by the anomaly detecting section 31.

An anomaly signal S_tr, which informs the occurrence of an anomaly in the mechanical structure of the EPS actuator 10, is input to the anomaly detecting section 31. In response to the anomaly signal S_tr, the anomaly detecting section 31 detects an anomaly in the mechanical system of the EPS 1. Also, state quantities such as the phase electric current values Iu, Iv, Iw and the rotation angular velocity ω of the motor 12 and the duty command values αu, αv, αw of the respective phases are input to the anomaly detecting section 31. Based on these state quantities, the anomaly detecting section 31 detects an anomaly of the torque sensor 14 and an anomaly of a power supply system for the motor 12, which is, specifically, an overcurrent or a failure of electric current flow in any one of the phases of the motor 12 caused by a break of a power cable (including a motor coil) or a failed contact of the driver circuit 18.

If a phase electric current value Ix (=Iu, Iv, or Iw) of X phase (X=U, V, or W) is smaller than or equal to a predetermined value Ith (|Ix|≦Ith) and the rotation angular velocity ω is smaller than or equal to a predetermined value ω0 (|ω|≦ω0), failure of an electric current flow is detected in the phase depending on whether the duty command value αx (=αu, αv, or αw) corresponding to the phase is continuously maintained outside a predetermined range corresponding to the values Ith and ω0, which range is greater than or equal to a predetermined value αLo and smaller than or equal to a predetermined value αHi (αLo≦αx≦αHi).

The value Ith for the phase electric current value Ix is set to zero or a value approximate to zero. The value ω0 for the rotation angular velocity ω is set to the value corresponding to the base speed (the maximum number of rotation) of the motor 12. The value αLo for the duty command value αx is set to a value smaller than the minimum value of the duty command value αx in the normal state. The value αHi for the duty command value αx is set to a value greater than the maximum value of the duty command value αx in the normal state.

Figure 3:
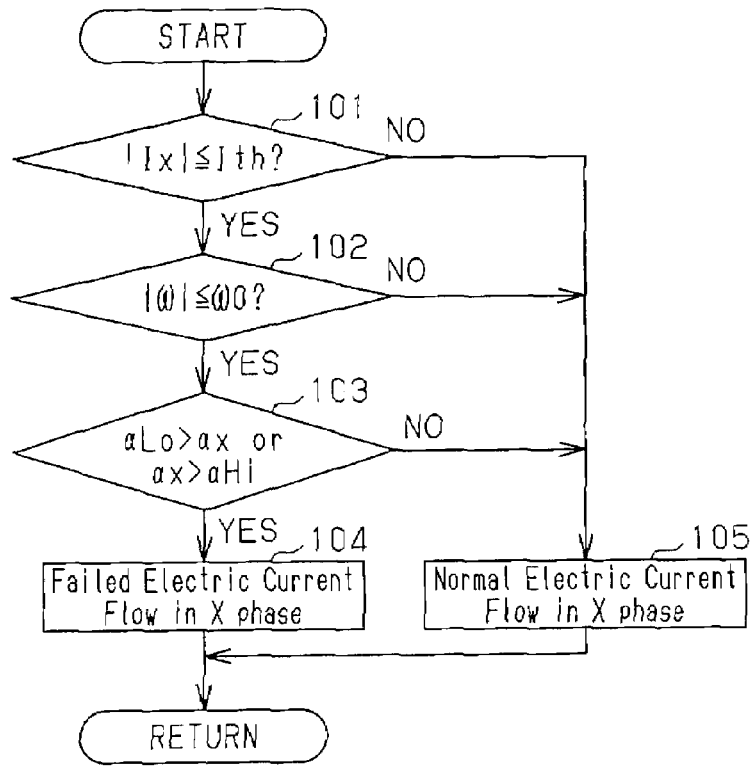
FIG. 3 is a flowchart representing a routine carried out by the EPS of FIG. 1 to determine whether an anomaly has occurred.

In other words, with reference to FIG. 3, the anomaly detecting section 31 determines whether (the absolute value of) the phase electric current value Ix of the X phase, which is detected by one of the electric current sensors 21u, 21v, 21w, is smaller than or equal to the value Ith in step 101. If it is determined that the phase electric current value Ix is smaller than or equal to the value Ith (step 101: YES), the anomaly detecting section 31 determines whether (the absolute value of) the rotation angular velocity ω is smaller than or equal to the value ω0 in the subsequent step 102. If it is determined that the rotation angular velocity ω is smaller than or equal to the value ω0 (step 102: YES), the anomaly detecting section 31 determines, in the subsequent step 103, whether the duty command value αx is smaller than the value αLo or greater than the value αHi. If it is determined that the duty command value αx is smaller than the value αLo or greater than the value αHi (step 103: YES), the anomaly detecting section 31 determines that a failure of electric current flow has likely occurred in the X phase in step 104.

If it is determined that the phase electric current value Ix is greater than the predetermined value Ith (step 101: NO), that the rotation angular velocity ω is greater than the value ω0 (step 102: NO), or that the duty command value αx is greater than or equal to the value αLo and smaller than or equal to the value αHi (step 103: NO), the anomaly detecting section 31 determines that the X phase is free from a failure of electric current flow in step 105.

If a failure of electric current flow occurs in the X phase, the phase electric current value Ix of the X phase drops to zero. The followings are two other possible cases in which the phase electric current value Ix of the X phase becomes zero or a value approximate to zero, other than the failed electric current flow.

The rotation angular velocity ω of the motor 12 reaches the base speed (the maximum number of rotation).

The electric current command value is zero or a value approximate to zero.

Thus, the anomaly detecting section 31 compares the phase electric current value Ix of the X phase, the object of the anomaly determination, with the value Ith, which is set to zero or a value approximate to zero. In this manner, the anomaly detecting section 31 detects whether the phase electric current value Ix is zero or a value approximate to zero (step 101). The anomaly detecting section 31 then determines whether the phase electric current value Ix is zero or a value approximate to zero due to a cause other than the failed electric flow, which is any one of the above listed two cases (steps 102, 103). If the two cases are both ruled out, the anomaly detecting section 31 determines that it is likely that a failed electric current flow has been caused in the X phase. That is, if the duty command value αx reaches an extreme level without increase of the rotation angular velocity ω of the motor 12 to the level at which the phase electric current value Ix drops to zero or a value approximate to zero, that is, a value smaller than or equal to the value Ith, the anomaly detecting section 31 determines that a failure of electric current flow has likely occurred in the X phase. The anomaly detecting section 31 carries out the routine of FIG. 3 to determine whether an anomaly has occurred, for the respective one of the U, V, and W-phases.

Although omitted from FIG. 3 for the illustrative purposes, the routine of anomaly determination is performed only when the voltage of the power supply is greater than or equal to a specified voltage necessary to drive the motor 12. The anomaly detecting section 31 makes a final determination that a failed electric current flow has occurred in the X phase in step 104 only when the determination that the failed electric current flow has been caused in the X phase is continuously maintained exceeding a predetermined time.

Based on the result of the determination by the anomaly detecting section 31, the ECU 11 (the microcomputer 17) switches the control modes of the motor 12. Specifically, the anomaly detecting section 31 outputs the result of the determination as an anomaly detection signal S_tm. The electric current command value calculating section 23 and the motor control signal generating section 24 calculate the electric current command values and generate the motor control signal in correspondence with the anomaly detection signal S_tm, which is output by the anomaly detecting section 31. This switches the control modes of the motor 12 operated by the microcomputer 17.

More specifically, the ECU 11 operates in accordance with three control modes, which are a "normal mode" for the normal state, an "assist suspension mode" for when an anomaly has been caused and thus the motor 12 needs to be stopped, and a "two phase drive mode" for when a failure of electric current flow has occurred in any one of the phases of the motor 12. As long as the anomaly detection signal S_tm provided by the anomaly detecting section 31 corresponds to the normal control mode, the electric current command value calculating section 23 calculates the d-axis electric current command value Id* and the q-axis electric current command value Iq* in the above-described manner for the normal state, while the motor control signal generating section 24 generates the motor control signal also in the above-described manner for the normal state.

If the anomaly detection signal S_tm of the anomaly detecting section 31 corresponds to the assist suspension mode, the electric current command value calculating section 23 calculates the d-axis electric current command value Id* and the q-axis electric current command value Iq* and the motor control signal generating section 24 generates the motor control signal in such a manner as to stop the motor 12. The control mode of the ECU 11 is switched to the assist suspension mode if an anomaly is caused in the mechanical system or the torque sensor 14 or an anomaly such as an overcurrent is caused in the power supply system. In accordance with the assist suspension mode, the motor 12 may be stopped immediately. Alternatively, the motor 12 may be stopped by gradually reducing the output of the motor 12, or the assist force. In the latter case, (the absolute value of) the q-axis electric current command value Iq*, which is provided by the electric current command value calculating section 23, gradually decreases. After stopping the motor 12, the microcomputer 17 switches the switching elements of the driver circuit 18 to open states and opens a non-illustrated power source relay.

If the anomaly detection signal S_tm provided by the anomaly detecting section 31 corresponds to the two phase drive mode, the motor control signal generating section 24 generates the motor control signal based on the two phases other than the phase with the failed electric current flow. The anomaly detection signal S_tm corresponding to the two phase drive mode carries information needed for identifying the phase in which the failure of electric current flow has occurred.

In the two phase drive mode, the electric current command value calculating section 23 calculates the phase electric current command values in such a manner as to produce the motor electric current (the q-axis electric current value Iq) matching the required torque, or the target control value of the motor torque (the q-axis electric current command value Iq*), except for at specific rotation angles corresponding to the phase with the failed electric current flow. The motor control signal generating section 24 generates the motor control signal by performing feedback control on the phase electric currents with reference to the corresponding phase electric current command values.

Specifically, if the anomaly detection signal S_tm output by the anomaly detecting section 31 corresponds to the two phase drive mode, the electric current command value calculating section 23 calculates the phase electric current command value for one of the two functioning phases using the following expressions (1), (2), and (3), depending on which of the phase has caused the failed electric current flow.

If the failure of electric current flow has occurred in the U-phase:

$$Iv^* = \frac{Iq^*}{\sqrt{2}\cos\theta} \tag{1}$$

If the failure of electric current flow has occurred in the V-phase:

$$Iu^* = \frac{-Iq^*}{\sqrt{2}\sin(\theta - \frac{\pi}{6})} \tag{2}$$

If the failure of electric current flow has occurred in the W-phase:

$$Iu^* = \frac{-Iq^*}{\sqrt{2}\sin(\theta + \frac{\pi}{6})} \tag{3}$$

Figure 4:
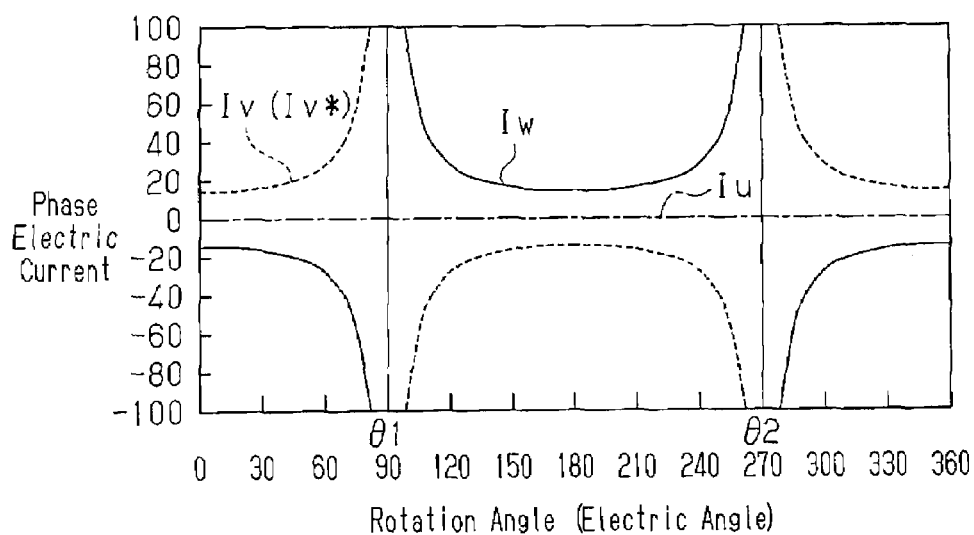
FIG. 4 is a graph representing changes of phase electric currents in a two phase drive mode of the EPS of FIG. 1.
Figure 5:
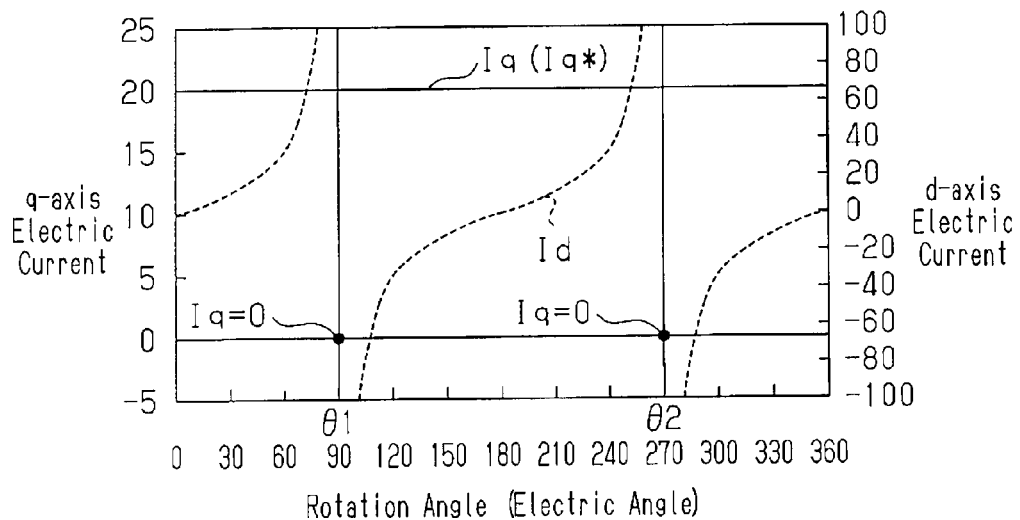
FIG. 5 is a graph representing a change of a d-axis electric current and a change of a q-axis electric current in the two phase drive mode of the EPS of FIG. 1.

The phase electric current command values calculated using the expressions (1) to (3) change in accordance with a secant curve (inverse of cosine) or a cosecant curve (inverse of sine) with asymptotic lines at specific rotation angles θ1, θ2 corresponding to the phase with the failed electric current flow. With reference to FIG. 4, in which a failure of electric current flow has occurred in the U-phase but normal electric current flows are maintained in the V and W-phases, the rotation angle θ1 and the rotation angle θ2 are 90° and 270°, respectively. If a failed electric current flow has occurred in the V-phase with the normal electric current flows maintained in the U and W-phases, the rotation angle θ1 and the rotation angle θ2 are 30° and 210°, respectively. If a failed electric current flow has occurred in the W-phase with the normal electric current flows ensured in the U and V-phases, the rotation angle θ1 and the rotation angle θ2 are 150° and 330°, respectively. In accordance with the motor control signal produced based on the thus obtained phase electric current command values, the motor 12 is operated. This generates the motor electric current (the q-axis electric current value Iq) matching the required torque (the q-axis electric current command value Iq*), except for at the rotation angles θ1, θ2 corresponding to the phase with the failed electric current flow, with reference to FIG. 5. In this state, the d-axis electric current value Id changes in accordance with a tangent curve.

In other words, through such control, a torque ripple is suppressed regardless of which of the phases of the motor 12 has caused a failed electric current flow. As a result, while maintaining satisfactory steering comfort, the assist force is continuously applied to the steering system.

More specifically, as illustrated in FIG. 2, the motor control signal generating section 24 has a second control section 24b, which calculates phase voltage command values Vu, Vv, Vw** by performing feedback control on the phase electric currents in correspondence with a phase electric current command value Ix* (=Iu*, Iv*, or Iw*) provided by the electric current command value calculating section 23. If the anomaly detection signal S_tm of the anomaly detecting section 31 corresponds to the two phase drive mode, the motor control signal generating section 24 generates the motor control signal based on the phase voltage command values Vu, Vv, Vw, which are obtained by the second control section 24b. The second control section 24b performs feedback control exclusively on a control phase, which is one of the two phases other than the phase with the failed electric current flow. In this manner, the second control section 24b obtains the phase voltage command value for the control phase. Based on the phase voltage command value, the second control section 24b determines the phase voltage command values Vu, Vv, Vw. In other words, based on the phase voltage command value, the second control section 24b determines the remaining two of the phase voltage command values.

Specifically, the second control section 24b has a control phase selecting section 32, which receives the phase electric current values Iu, Iv, Iw and the anomaly detection signal S_tm. In accordance with the anomaly detection signal S_tm, the control phase selecting section 32 selects the phase for which the phase electric current is feedback controlled, that is, the control phase, from the two phases other than the phase with the failed electric current flow. The control phase selecting section 32 outputs the phase electric current value Ix of the phase selected as the control phase to a subtractor 33.

The phase electric command value Ix*, which is provided by the electric current command value calculating section 23, is input to the subtractor 33 along with the phase electric current value Ix provided by the control phase selecting section 32. The phase electric current command value Ix* and the phase electric current value Ix, which are input to the subtractor 33, correspond to the phase selected as the control phase. The subtractor 33 obtains a phase electric current deviation ΔIx by subtracting the phase electric current value Ix from the phase electric current command value Ix*. The subtractor 33 then outputs the obtained phase electric current deviation ΔIx to a feedback control section 34. The feedback control section 34 calculates the phase voltage command value Vx* (=Vu*, Vv*, or Vw*) for the control phase by multiplying the phase electric current deviation ΔIx by a predetermined feedback gain (a PI gain).

The phase voltage command value Vx*, which is determined by the feedback control section 34, is input to a phase voltage command value calculating section 35. The phase voltage command value calculating section 35 calculates the phase voltage command values Vu, Vv, Vw** based on the phase voltage command value Vx*.

An electric current cannot flow through the phase in which the failure of electric current flow has been caused. The two phases other than the phase with the failed electric current flow are offset by π/2 (180°). Thus, the phase voltage command value of the phase with the failed electric current flow is zero. The phase voltage command value of the functioning phase other than the functioning phase selected as the control phase is obtained by reversing the sign of the phase voltage command value of the phase selected as the control phase. The second control section 24b then sends the thus obtained phase voltage command values (Vu, Vv, Vw**) to a switching control section 29.

The switching control section 29 receives the anomaly detection signal S_tm, which is provided by the anomaly detecting section 31. If the anomaly detection signal S_tm of the anomaly detecting section 31 corresponds to the two phase drive mode, the switching control section 29 outputs the phase voltage command values Vu, Vv, Vw** output by the second control section 24b, instead of the phase voltage command values Vu*, Vv*, Vw* output by the first control section 24a, to the PWM converting section 30. The PWM converting section 30 thus produces the motor control signal having an ON duty ratio corresponding to the phase voltage command values Vu, Vv, Vw**. The motor control signal is then output to the driver circuit 18.

A procedure for switching the control modes and a procedure for generating the motor control signal in the two phase drive mode, which are carried out by the microcomputer 17, will hereafter be explained.

Figure 6:
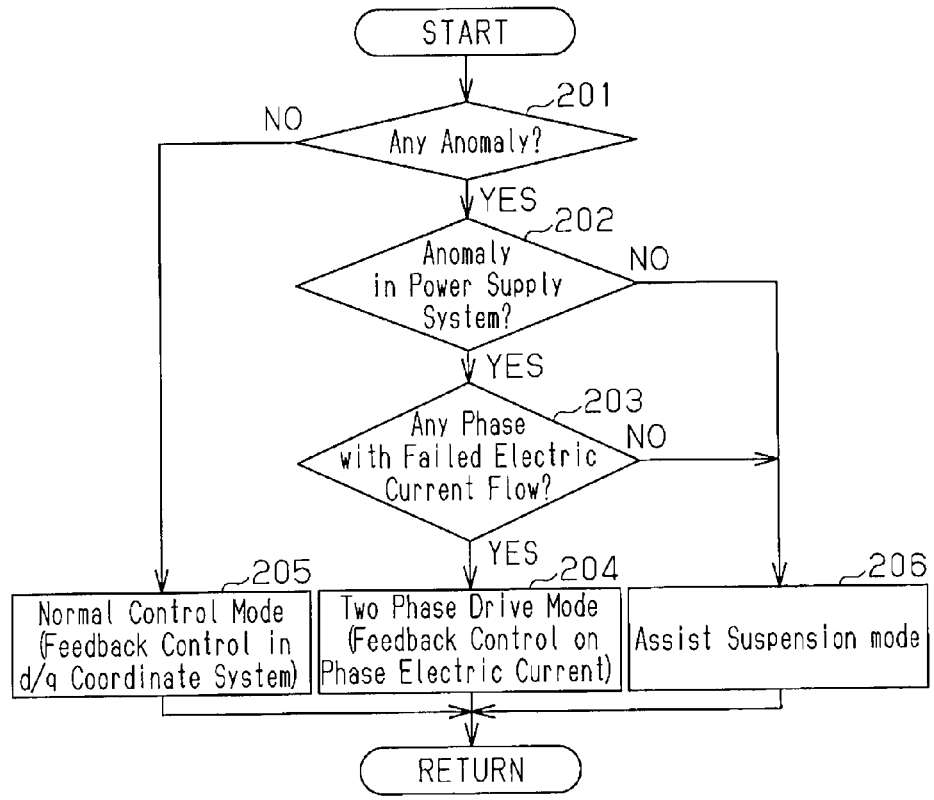
FIG. 6 is a flowchart representing a procedure for switching control modes of the EPS of FIG. 1.

As illustrated in FIG. 6, the microcomputer 17 first determines whether any anomaly has occurred in step 201. If it is determined that an anomaly has occurred (step 201: YES), the microcomputer 17 determines whether the anomaly has occurred in the power supply system in the subsequent step 202. If it is determined that the anomaly has occurred in the power supply system (step 202: YES), the microcomputer 17 determines whether the anomaly of the power supply system corresponds to a phase with a failed electric current flow, that is, a failure of electric current flow in any one of the phases, in step 203. If it is determined that there is a phase with a failed electric current flow (step 203: YES), the microcomputer 17 selects the two phase drive mode as the control mode in step 204. As a result, the motor control signal is generated and output based on the two phases other than the phase with the failed electric current flow.

As has been described, to generate the motor control signal in the two phase drive mode, the feedback control is carried out on the phase electric currents in such a manner as to produce the motor electric current (the q-axis electric current value Iq) matching the required torque, that is, the target control value of the motor torque (the q-axis electric current command value Iq*), except for at the specific rotation angles corresponding to the phase with the failed electric current flow.

Figure 7:
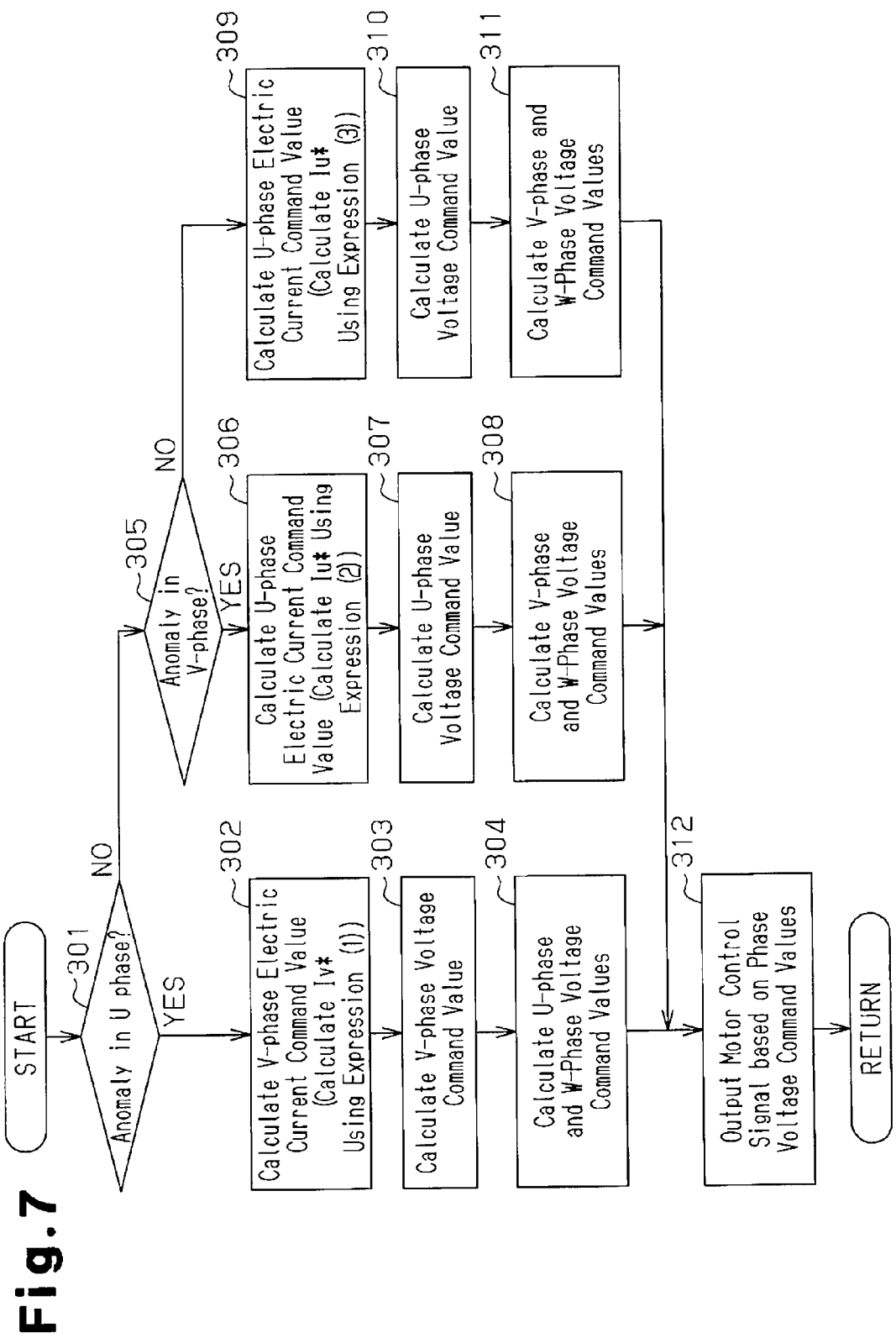
FIG. 7 is a flowchart representing a procedure for generating a motor control signal in the two phase drive mode of the EPS of FIG. 1.

Specifically, with reference to FIG. 7, the microcomputer 17 first determines whether the failure of electric current flow has occurred in the U-phase in step 301. If it is determined that the failed electric current has been caused in the U-phase (step 301: YES), the microcomputer 17 calculates the phase electric current command value Iv* of the V-phase using the above-listed expression (1) in the subsequent step 302. Then, in step 303, the microcomputer 17 feedback controls the V-phase electric current in accordance with the phase electric current command value Iv* so as to calculate the phase voltage command value Vv of the V-phase. In the subsequent step 304, the microcomputer 17 determines the phase voltage command values Vu, Vw of the two other phases (the U and W-phases) based on the phase voltage command value Vv (Vu=0, Vw=−Vv**).

If it is determined that the failure of electric current flow has not occurred in the U-phase in step 301 (step 301: NO), the microcomputer 17 determines whether the failure of electric current flow has been caused in the V-phase in the subsequent step 305. If it is determined that the failed electric current flow has occurred in the V-phase (step 305: YES), the microcomputer 17 calculates the phase electric current command value Iu* of the U-phase using the above-listed expression (2) in the subsequent step 306. Then, in step 307, the microcomputer 17 feedback controls the U-phase electric current in accordance with the phase electric current command value Iu* to obtain the phase voltage command value Vu of the U-phase. In the subsequent step 308, the microcomputer 17 determines the phase voltage command values Vv, Vw of the two other phases (the V and W-phases) based on the phase voltage command value Vu (Vv=0, Vw=−Vu**).

If it is determined that the failure of electric current flow has not occurred in the V-phase in step 305 (step 305: NO), the microcomputer 17 calculates the phase electric current command value Iu* of the U-phase using the above-listed expression (3) in the subsequent step 309. Then, in step 310, the microcomputer 17 feedback controls the U-phase electric current in accordance with the phase electric current command value Iu* to obtain the phase voltage command value Vu of the U-phase. In the subsequent step 311, the microcomputer 17 determines the phase voltage command values Vv, Vw of the two other phases (the V and W-phases) based on the phase voltage command value Vu (Vv=−Vu, Vw**=0).

Then, in step 312, the microcomputer 17 generates the motor control signal in correspondence with the phase voltage command values Vu, Vv, Vw** obtained in step 304, 308, or 311 and outputs the motor control signal to the driver circuit 18.

If it is determined that there is no anomaly in step 201 (step 201: NO), the microcomputer 17 selects the normal control mode as the control mode in the subsequent step 205. As a result, as has been described, the feedback control is carried out on the electric currents in the d/q coordinate system so as to generate and output the motor control signal. If it is determined that the anomaly has not occurred in the power supply system (step 202: NO) or that there is no phase with a failed electric current flow (step 203: NO), the microcomputer 17 selects the assist suspension mode as the control mode in the subsequent step 206. As a result, the motor control signal is produced and output in such a manner as to stop operation of the motor 12 and to open the power source relay.

The illustrated embodiment has the following advantages.

The microcomputer 17 has the anomaly detecting section 31, which detects an anomaly such as a failure of electric current flow in any one of the phases of the motor 12. If the anomaly is detected, the microcomputer 17 generates and outputs a motor control signal based on the two phases other than the phase with the failed electric current. At this stage, the microcomputer 17 produces the motor control signal in such a manner as to produce the motor electric current (the q-axis electric current value Iq) matching the required torque, that is, the target value of the motor torque (the q-axis electric current command value Iq*), except for at the specific rotation angles corresponding to the phase with the failed electric current flow. Thus, even if the electric current flow fails in any one of the phases of the motor 12, a torque ripple is suppressed. As a result, while maintaining satisfactory steering comfort, the assist force is continuously applied to the steering system.

The microcomputer 17 has the electric current command value calculating section 23 and the motor control signal generating section 24. The electric current command value calculating section 23 calculates the electric current command values. The motor control signal generating section 24 generates the motor control signal based on the electric current command values obtained by the electric current command value calculating section 23. If a failed electric current flow is caused in any one of the phases of the motor 12, the motor control signal generating section 24 performs feedback control on the phase electric currents of the phases other than the phase with the failure. The motor control signal generating section 24 thus generates the motor control signal. In this state, the electric current command value calculating section 23 calculates the phase electric current command value that changes in accordance with the secant or cosecant curve with the asymptotic lines at the specific rotation angles (see the expressions (1) to (3)). As a result, except for at the specific rotation angles corresponding to the phase with the failed electric current flow, the produced motor electric current (q-axis electric current value Iq) matches the required torque, that is, the target control value of the motor torque (the q-axis electric current command value Iq*).

The illustrated embodiment may be modified as follows.

Although the present invention is embodied as the motor controller of the electric power steering apparatus (the EPS) in the illustrated embodiment, the invention may be embodied as a motor controller for uses other than the use in the EPS.

In the illustrated embodiment, the ECU 11 as the motor controller operates in the three control modes, which are the normal control mode, the assist suspension mode, and the two phase drive mode. However, the ECU 11 may operate in any suitable modes other than those of the embodiment as long as the motor 12 is operated using the two phases other than the phase with a failed electric current flow if such failure occurs. Also, the anomaly detecting section 31 may determine whether an anomaly has occurred using any suitable procedure other than that of the embodiment.

In the illustrated embodiment, in generation of the motor control signal in the normal state, the microcomputer 17 (the motor control signal generating section 24) converts the phase electric current values Iu, iv, Iw, which are detected by the electric current sensors 21u, 21v, 21W, to the d-axis electric current value Id and the q-axis electric current value Iq of the d/q coordinate system. The microcomputer 17 thus performs feedback control on the electric currents in the d/q coordinate system. However, the present invention is not restricted to this. That is, the microcomputer 17 may carry out feedback control on the phase electric currents to generate the motor control signal also in the normal state.

In the illustrated embodiment, the electric current command value calculating section 23 outputs the phase electric current command value for one of the two phases other than the phase with the failed electric current flow. The motor control signal generating section 24 calculates the phase voltage command value for the phase using the phase electric current command value provided by the electric current command value calculating section 23. The motor control signal generating section 24 then determines the phase voltage command values for the other two phases. However, the present invention is not restricted to this. The electric current command value calculating section 23 may output phase electric current command values for both of the two phases other than the phase with the failure of electric current flow.

In the illustrated embodiment, using the expressions (1) to (3), the phase electric current command value Iv* of the V-phase is calculated if a failure of electric current flow occurs in the U-phase. Further, the phase electric current command value Iu* of the U-phase is determined if such failure occurs in the V-phase or the W-phase. However, the present invention is not restricted to this. That is, the phase electric current command value (Iw*) of the W-phase may be obtained if a failure of electric current flow occurs in the U-phase or the V-phase. Further, if such failure is caused in the W-phase, the phase electric current command value (Iv*) of the V-phase may be calculated. In this case, the expressions (1) to (3) need to be applied with the signs reversed.

The phase voltage command value, which is set if a failure of electric current flow occurs in any one of the phases of the motor 12, does not necessarily have to be precisely equal to the value calculated using the expressions (1) to (3). Even if the phase electric current command value is set to a value changing substantially in accordance with the secant or cosecant curve or in a manner similar to this with the asymptotic lines at the specific rotation angles, advantages similar to those of the illustrated embodiment are ensured. However, the phase electric current command values obtained by the expressions (1) to (3) are optimal since these values lead to generations of the motor electric current optimally matching the required torque.

In the two phase drive mode, the electric current command value calculating section 23 may perform a guard procedure so that (the absolute value of) the phase electric current command value Ix*, which is output by the electric current command value calculating section 23, is limited to a predetermined range. Specifically, the phase electric current command value Ix* may be restricted to the range represented by the following expression (4).

$$-\sqrt{\frac{3}{2}\text{Ix\_max}^2 - Iq^{*2}} \leq Ix^* \leq \sqrt{\frac{3}{2}\text{Ix\_max}^2 - Iq^{*2}} \tag{4}$$

In the expression (4), the value Ix_max is the upper limit of the electric current that can be supplied to the X phase (the U, V, or W-phase). The upper limit is determined in accordance with the rated current or the like of each switching element of the driver circuit 18. The expression (4) is related to the condition that should be met by the phase electric current command value Ix* to generate the motor electric current matching the required torque under restriction of such upper limit.

Figure 8:
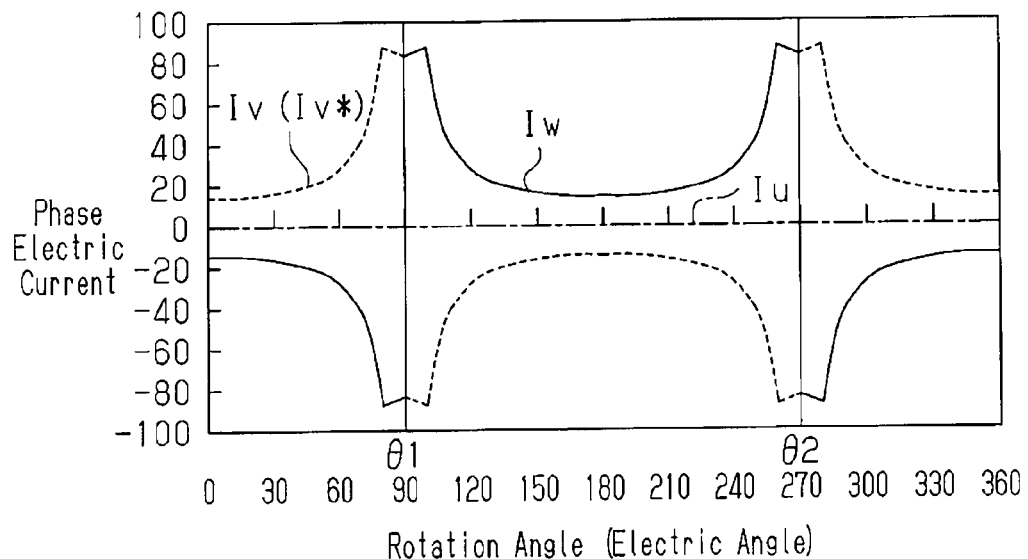
FIG. 8 is a graph representing changes of phase electric currents in a two phase drive mode of an EPS according to another embodiment of the present invention.
Figure 9:
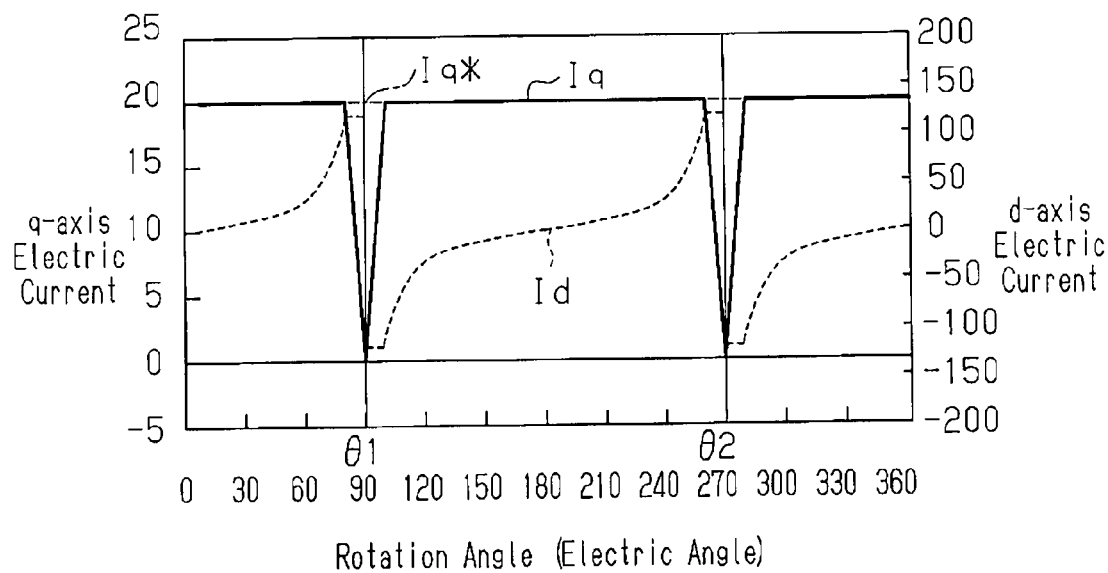
FIG. 9 is a graph representing a change of a d-axis electric current and a change of a q-axis electric current in a two phase drive mode of the EPS according to the embodiment of FIG. 8.
Figure 10:
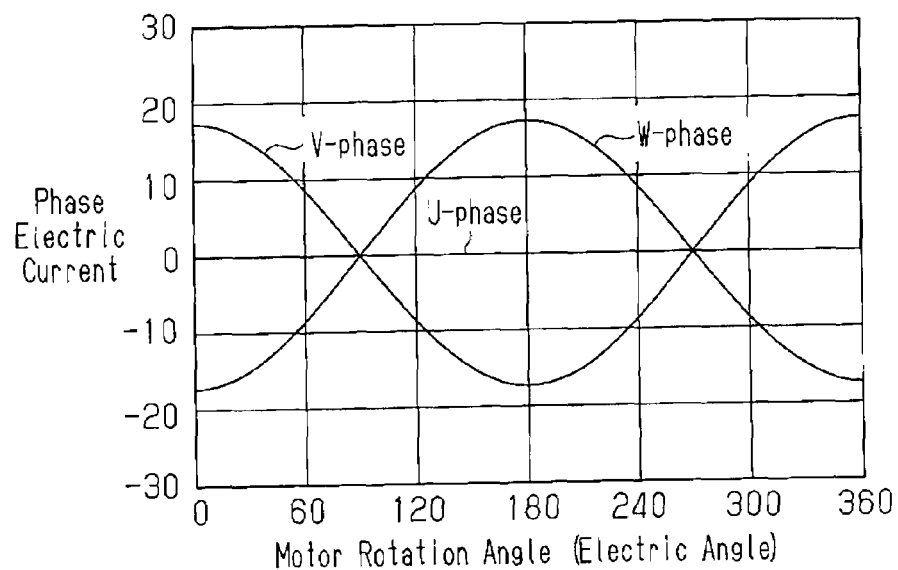
FIG. 10 is a graph representing changes of phase electric currents in a two phase drive mode of a conventional EPS.
Figure 11:
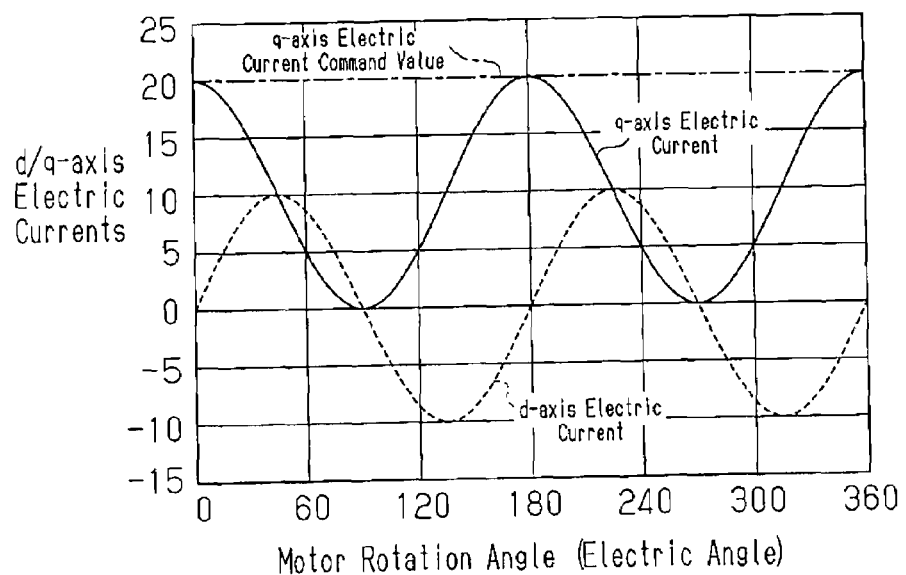
FIG. 11 is a graph representing a change of d-axis electric current and a change of q-axis electric current in a two phase drive mode of the conventional EPS.

In many cases, there is an upper limit for (the absolute value of) the electric current that can flow in each of the phases of the motor 12. A flow of electric current exceeding the upper limit may heat the driver circuit 18 (more accurately, the switching elements of the driver circuit 18) and the motor coil 12u, 12v, or 12w of the U, V, or W-phase. FIG. 8 represents changes of the phase electric currents in the guard procedure performed when the electric current flow has failed in the U-phase and normal electric current flows are maintained in the V and W-phases. In this case, as illustrated in FIG. 9, the motor electric current (the q-axis electric current value Iq) matching the required torque (the q-axis electric current command value Iq*) cannot be generated in some restricted ranges of the rotation angles approximate to the rotation angles θ1, θ2. However, in these ranges, the electric current values of the V and W-phases are prevented from increasing to an extreme extent (see FIGS. 4 and 5). As a result, the motor 12 is operated further stably.

The invention claimed is:

1. A motor controller comprising:
    a motor control signal output section that outputs a motor control signal; and
    a driver circuit that supplies a three phase drive power to a motor based on the motor control signal provided by the motor control signal output section, wherein the motor control signal output section includes:
    an electric current command value calculating section that calculates an electric current command value corresponding to a required torque to be generated by the motor;
    a motor control signal generating section that generates the motor control signal by performing a feedback control on an electric current in such a manner as to produce a motor electric current corresponding to the electric current command value obtained by the electric current command value calculating section; and
    an anomaly detecting section that detects a failed electric current flow in any one of phases of the motor,
    wherein, if the anomaly detecting section detects a failed electric current flow in any phase of the motor, the motor control signal output section generates, based on a phase other than the phase with the failed electric current flow, the motor control signal in such a manner that the motor electric current matches the required torque except for at a specific rotation angle corresponding to the phase with the failed electric current flow.

2. The motor controller according to claim 1, wherein, if the anomaly detecting section detects a failed electric current flow in any one of the phases of the motor, the motor control signal generating section generates the motor control signal by performing a feedback control on a phase electric current of a phase other than the phase with the failed electric current flow, and the electric current command value calculating section calculates a phase electric current command value that changes in accordance with a secant curve or a cosecant curve with an asymptotic line at the specific rotation angle.

3. The motor controller according to claim 2, wherein, if a failed electric current flow is detected in any one of the phases of the motor by the anomaly detecting section, the electric current command value calculating section calculates the phase electric current command value using:
    an expression (1) when the failure of electric current flow has occurred in a U-phase;

$$Iv^* = \frac{Iq^*}{\sqrt{2}\cos\theta} \tag{1}$$

an expression (2) when the failure of electric current flow has occurred in a V-phase;

$$Iu^* = \frac{-Iq^*}{\sqrt{2}\sin\left(\theta - \frac{\pi}{6}\right)} \quad (2)$$

an expression (3) when the failure of electric current flow has occurred in a W-phase, $$Iu^* = \frac{-Iq^*}{\sqrt{2}\sin\left(\theta + \frac{\pi}{6}\right)} \quad (3)$$

in which θ represents a rotation angle, Iq* represents a q-axis electric current command value, Iu* represents a U-phase electric current command value, and Iv* represents a V-phase electric current command value.

4. The motor controller according to claim 2, wherein the electric current command value calculating section carries out a guard procedure so as to limit the phase electric current command value output by the electric current command value calculating section to a predetermined range.

5. An electric power steering apparatus including the motor controller according to claim 1.

* * * * *